3,085,920
WOOD PRODUCTS AND METHOD
Charles W. Taylor, Jr., Akron, and Kenneth N. Remita, Wadsworth, Ohio, assignors to The Goodyear Tire & Rubber Company, Akron, Ohio, a corporation of Ohio
No Drawing. Filed May 9, 1958, Ser. No. 734,098
8 Claims. (Cl. 154—43)

This invention relates to a method of laminating and pre-finishing wood and to the products produced thereby.

Wood has been laminated by the use of adhesives such as animal glue, alkyd resins, phenolic resins, and other water-soluble and heat-setting adhesives. Use of these adhesives involves using a solution or dispersion of the adhesive in water or some other solvent, coating the wood to be laminated, removing the solvent and then heating and pressing to laminate the wood and to cure the adhesive and form a strong bond. Dry adhesives have been used but they are, for the most part, low molecular weight thermosetting resins and have not been entirely satisfactory.

Wood has also been pre-finished by manufacturers of wood products and as such is presently available, chiefly in the form of pre-finished plywood sheets. Wood is generally pre-finished by first sanding its surface to make it smooth and then coating it with two or three finish coats of a solution-finish such as a lacquer or varnish. Each coat applied is dried and sanded or buffed before the next coat is put on. Pre-finishing of wood as it is now done is expensive and time-consuming.

It is an object of this invention to provide a method of laminating and pre-finishing wood. It is another object of this invention to provide a method of laminating and/or pre-finishing wood in which a thermoplastic copolyester resin is used as the laminating and/or pre-finishing layer. It is another object of this invention to provide pre-finished laminated wood articles which have a pleasing appearance and are resistant to the effects of moisture and chemicals and are also highly resistant to abrasion and scratching.

According to this invention, wood is laminated to copolyester resin by contacting the wood with a sheet or film of the copolyester resin and heating and pressing to form a composite article.

The practice of the invention is illustrated by the following examples:

*Example 1*

Ten samples of different kinds of wood were coated with two coats of a random 60/40 ethylene terephthalate-ethylene isophthalate super polyester resin (the ratio 60/40 signifies that in the copolyester resin the ethylene terephthalate units comprise 60 percent of the sum of ethylene terephthalate and ethylene isophthalate units and the ethylene isophthalate units comprise 40 percent of said sum). The preparation of this type of polyester is described in copending application Serial No. 413,722, filed March 4, 1954. The coating was applied by dipping the sample of wood in a 15% solution of the copolyester resin dissolved in a solvent composed of a 50/50 dioxane-methyl ethyl ketone mixture, drying to remove the solvent at a relatively low temperature, and then further drying at a temperature between 200 and 250° F. The first coat applied was rubbed with steel wool before the second coat was put on. The coated samples were tested in a weatherometer and after 218 hours exposure in the weatherometer were in excellent condition. Uncoated samples of the same woods, exposed to the weatherometer at the same time, swelled and showed signs of weathering.

*Example 2*

Birch veneer and black walnut veneer were prepared by coating the inner core and inside edge of samples of each with a solution of the 60/40 resin as used in Example 1. They were dried overnight at room temperature and then the veneers were arranged with their respective cores as a sandwich and were heated at 250° F. under pressure in a small press.

A sample of plywood prepared according to Example 2 was tested for resistance to water. After soaking for two days at room temperature, it was still in good condition and showed no signs of deterioration.

In addition to laminating and pre-finishing wood by the solution method described above, dry film lamination or pre-finishing is readily accomplished by placing a preformed, self sustaining film of 60/40 ethylene terephthalate-ethylene isophthalate resin in contact with a wood surface and heating at 250 to 325° F. at pressures of from contact pressure to 1,000 pounds per square inch. Thus, the film can be applied to wood surfaces in a single ply to form a pre-finished surface on the wood. The film can be applied to multiple plies of wood, the layers being alternately film and wood, effecting bonding of the various plies and finishing of the wood at the same time. Laminates of a plurality of layers of wood and film can also be made from already pre-finished plies or sheets by contacting unfinished wood surfaces with the film on a pre-finished sheet or by contacting the film of a pre-finished sheet with the film of another pre-finished sheet and heating and pressing the composite stack to cause the layers to laminate. The pre-finished plies or sheets of wood used to make multiple-ply laminates can be made by the solution method or by the preformed film method.

When the dry film technique is used, the surface of the wood does not need to be sanded smooth, but the wood can be laminated even though the surface is relatively rough. Pressing the dry film against the wood base presses projecting pieces and splinters into the wood, binds them to the base and also fills indentations in the wood so that a smooth coating is obtained without the sanding or buffing required in finishing wood by the use of solution-type finishes. It is preferred that the wood surface be dry and that the moisture content of the wood be controlled so that the wood contains not more than 20% by weight of moisture. Wet laminations can be made but it is preferred that the wood be relatively dry.

When making pre-finished wood by the dry film technique described, a film having a thickness of from 3 mils to 7½ mils is generally used. The thickness of the film used will depend on the type of wood surface to which it is applied. The higher the porosity count of the wood, the thicker the film required to give adequate coverage and protection to the wood surface. While thicker or thinner films can be used, the preferred thickness is from 3 mils to 6 mils. The film can be applied to one or both exposed surfaces of the wood sheet by any suitable method. For example, the film and the wood base can be heated and pressed together in a regular press. The laminated article can be removed from the press while still hot or can be cooled before it is removed from the press if desired. Another method of laminating the film and the wood is to simultaneously pass the film and the wood through heated pressure rolls. Other methods of heating and intimately contacting the film and the wood can also be used.

The examples have illustrated the invention with respect to the use of a random ethylene terephthalate-ethylene isophthalate copolyester resin in which the ethylene terephthalate units comprise 60 percent of the sum of the ethylene terephthalate and ethylene isophthalate units in the copolyester and the ethylene isophthalate units comprise 40 percent of said sum. Other ethylene terephthalate-ethylene isophthalate copolyester resins which can also be used are the copolyesters in which the ethylene terephthalate units comprise from 65 to 30 percent of the sum of the ethylene terephthalate and ethylene isophthalate units in the copolyester and the ethylene isophthalate units comprise from 35 to 70 percent of said sum. Polyesters in which the ethylene terephthalate units comprise from 65 to 50 percent of the sum of the ethylene terephthalate and ethylene isophthalate units in the copolyester and the ethylene isophthalate units comprise from 35 to 50 percent of said sum are preferred and the most preferred copolyester resin is the 60/40 ethylene terephthalate-ethylene isophthalate copolyester.

When copolyester resin solutions are used to coat the wood surface, the concentration of the resin will generally be in the range of from 10 to 20% solids by weight dissolved in a suitable solvent such as a 50/50 dioxane-methyl ethyl ketone solvent mixture. Higher or lower concentrations can be used, if desired. Other solvents such as tetrachloroethane and trichloroethylene can be used but it is preferred to use a solvent which does not contain chlorinated hydrocarbons because of the toxic and corrosive effects that such materials generally have. The solution of the resin can be applied to wood by spray, dip, roller coat, doctor blade, or brush methods and is generally dried at a temperature below the boiling point of the solvent used to prevent blistering and bubble formation in the film. The last traces of solvent are removed from the film by force-drying at a temperature between 200 and 250° F.

Various types of woods can be laminated by the method of the present invention. Both soft woods, such as pine and Philippine mahogany, and hard woods, such as oak, walnut, birch and maple, can be used. Composition boards can also be used such as particle-type materials. Masonite and other composition boards can also be laminated. As indicated above, the thickness of the coating applied will depend on the protection required and on the softness or hardness or porosity of the wood base being coated.

The present invention has several advantages over prior methods of laminating and pre-finishing wood. Thus, the invention provides a method of laminating and pre-finishing wood using a thermoplastic resin which can be molded and pressed in regular presses without danger of overcure and spoiling of either the finish or the laminating layer. Dry film pre-finishes leave the natural wood dyes and colors in place and finishes natural wood surfaces natural. Solvent finishes displace colors and raise the grain. The surface of the pre-finished wood has superior resistance to abrasion, excellent resistance to outdoor aging and resistance to chemicals, greases, and oils. The finish also has excellent resistance to moisture vapor transmission and provides a moisture vapor barrier superior to any now used in wood finishes. The finish is easy to clean and because the polyester resin is relatively hard at room temperature, it resists the accumulation of dirt and regular household dust. The inherent resistance of the film to solvents, water or aqueous solutions makes the finish less susceptible to damage by solvents, soaps, and detergents generally used to clean painted surfaces. The resistance of the finish to wetting by water also affords an easy release of frost or ice films which form on wood surfaces in cold weather. The property of resistance to water and release of frost or ice films has been found to apply also to other cases in which water is a part of a mixture contacting the film and wood surfaces finished with the polyester film can be used to form a mold for materials such as concrete which ordinarily stick to wood forms or molds.

The coatings or laminations made from the amorphous noncrystallizable resins are also amorphous and possess all of the advantages of the properties of the amorphous resins. The coatings are clear, transparent, tough, noncrystalline, nonheat shrinkable and are resistent to abrasion and heat. Since they cannot be crystallized they do not develop opacity or spots of crystallites on exposure to heat. The coatings also have advantages from an optical standpoint as well as from their physical and chemical properties. Thus, a clear, transparent film laminated to wood appears to emphasize the natural grain and beauty of the wood sub-layer. The wood does not darken during the application of the film to its surface and the finished wood has a natural appearance.

In addition to the use of clear films, pigmented or colored films can also be used. The film can also be reverse coated with inks to give thin layers of color-bearing material that can range from opaque to transparent dye systems and thus an unlimited number of novel finishes can be applied to wood surfaces that cannot be applied by the methods now known.

While certain representative embodiments and details have been shown for the purpose of illustrating the invention, it will be apparent to those skilled in the art that various changes and modifications may be made therein without departing from the spirit or scope of the invention.

We claim:

1. The method of making a laminated wood article in which the surface layer consists of a random copolyester consisting of ethylene terephthalate and ethylene isophthalate units in which the ethylene terephthalate units comprise from 65 to 30 percent of the sum of the ethylene terephthalate and ethylene isophthalate units in the copolyester and the ethylene isophthalate units comprise from 35 to 70 percent of said said sum which comprises applying a coating of said layer to a wood surface and heating and pressing at from 250 to 325° F.

2. The method of making a laminate which consists of a layer of wood and a layer of a random copolyester consisting of ethylene terephthalate and ethylene isophthalate units in which the ethylene terephthalate units comprise from 65 to 30 percent of the sum of the ethylene terephthalate and ethylene isophthalate units in the copolyester and the ethylene isophthalate units comprise from 35 to 70 percent of said sum which comprises applying a coating of said copolyester resin to a wood surface and heating and pressing at from 250 to 325° F.

3. The method which comprises applying to a wood surface a solution comprising a solvent and a random copolyester consisting of ethylene terephthalate and ethylene isophthalate units in which the ethylene terephthalate units comprise from 65 to 30 percent of the sum of the ethylene terephthalate and ethylene isophthalate units in the copolyester and the ethylene isophthalate units comprise from 35 to 70 percent of said sum, evaporating the solvent and further drying at from 200 to 250° F.

4. The method which comprises applying to a wood surface a solution comprising a solvent and a random copolyester consisting of ethylene terephthalate and ethylene isophthalate units in which the ethylene terephthalate units comprise 60 percent of the sum of the ethylene terephthalate and ethylene isophthalate units in the copolyester and the ethylene isophthalate units comprise 40 percent of said sum, evaporating the solvent and further drying at from 200 to 250° F. and then cooling the composite article.

5. The product which comprises a wood base and a continuous, contiguous adherent coating of a random copolyester consisting of ethylene terephthalate and ethylene isophthalate units in which the ethylene terephthalate units comprise from 65 to 30 percent of the sum of the ethylene terephthalate and ethylene isophthalate units in the copolyester and the ethylene isophthalate units comprise from 35 to 70 percent of said sum.

6. A laminated article comprising a layer of wood and a continuous contiguous layer of a random copolyester resin consisting of ethylene terephthalate and ethylene isophthalate units in which the ethylene terephthalate units comprise from 65 to 30 percent of the sum of the ethylene terephthalate and ethylene isophthalate units in the copolyester and the ethylene isophthalate units comprise from 35 to 70 percent of said sum.

7. A laminated article comprising a layer of wood and a continuous contiguous layer of a random copolyester resin consisting of ethylene terephthalate and ethylene isophthalate units in which the ethylene terephthalate units comprise 60 percent of the sum of the ethylene terephthalate and ethylene isophthalate units in the copolyester and the ethylene isophthalate units comprise 40 percent of said sum.

8. A laminated product consisting of a wood base and a continuous contiguous surface layer of a random copolyester resin consisting of ethylene terephthalate and ethylene isophthalate units in which the ethylene terephthalate units comprise from 65 to 30 percent of the sum of the ethylene terephthalate and ethylene isophthalate units in the copolyester and the ethylene isophthalate units comprise from 35 to 70 percent of said sum.

References Cited in the file of this patent
UNITED STATES PATENTS

| | | |
|---|---|---|
| 2,631,960 | Dafter | Mar. 17, 1953 |
| 2,650,213 | Hofrichter | Aug. 25, 1953 |
| 2,691,006 | Flory | Oct. 5, 1954 |
| 2,765,250 | Williams | Oct. 2, 1956 |
| 2,865,891 | Michel | Dec. 23, 1958 |
| 2,870,124 | Ham | Jan. 20, 1959 |
| 2,892,747 | Dye | June 30, 1959 |

OTHER REFERENCES

"Alkyd Resins," article by R. H. Kienle et al., Ind. and Eng. Chem., April 1929, pages 349–352.